US012724143B2

(12) United States Patent
Jing et al.

(10) Patent No.: US 12,724,143 B2
(45) Date of Patent: Sep. 1, 2026

(54) DISTRIBUTED MICROWAVE RADAR IMAGING METHOD AND APPARATUS

(71) Applicant: Shenzhen Yinwang Intelligent Technologies Co., Ltd., Shenzhen (CN)

(72) Inventors: Guobin Jing, Shanghai (CN); Bin Hu, Beijing (CN); Jing Yang, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 529 days.

(21) Appl. No.: 18/147,528

(22) Filed: Dec. 28, 2022

(65) Prior Publication Data

US 2023/0152442 A1 May 18, 2023

Related U.S. Application Data

(63) Continuation of application No. PCT/CN2021/102923, filed on Jun. 29, 2021.

(30) Foreign Application Priority Data

Jun. 30, 2020 (CN) ......................... 202010617133.9

(51) Int. Cl.
*G01S 13/90* (2006.01)
*G01S 7/35* (2006.01)
(Continued)

(52) U.S. Cl.
CPC ........... *G01S 13/9011* (2013.01); *G01S 7/354* (2013.01); *G01S 7/412* (2013.01); *G01S 7/418* (2013.01); *G01S 13/87* (2013.01); *G01S 13/9021* (2019.05)

(58) Field of Classification Search
CPC ...... G01S 13/9011; G01S 7/354; G01S 7/418; G01S 13/9021; G01S 7/412; G01S 13/87;
(Continued)

(56) References Cited

U.S. PATENT DOCUMENTS 6,225,942 B1 * 5/2001 Alon .................... G01S 13/878 342/59
6,795,590 B1 * 9/2004 Chen ................... G06V 10/753 382/280
(Continued)

FOREIGN PATENT DOCUMENTS

CN 101685154 B * 12/2012
CN 106780309 A * 5/2017 ........... G06T 3/4038
(Continued)

OTHER PUBLICATIONS

Scheiber, R, and A Moreira. "Coregistration of Interferometric SAR Images Using Spectral Diversity." IEEE transactions on geoscience and remote sensing 38.5 (2000): 2179-2191. Web. (Year: 2000).*

*Primary Examiner* — Resha Desai
*Assistant Examiner* — Remash R Guyah
(74) *Attorney, Agent, or Firm* — Conley Rose, P.C.

(57) ABSTRACT

A distributed microwave radar imaging method includes obtaining a first echo signal received by a first microwave radar, where the first microwave radar is disposed at a first height; obtaining a second echo signal received by a second microwave radar, where the second microwave radar is disposed at a second height, and the first height is lower than the second height; determining a first radar imaging result image of a detected target based on the first echo signal; determining a second radar imaging result image of the detected target based on the second echo signal; fusing the first radar imaging result image and the second radar imaging result image to obtain a target fused image; and deter-
(Continued)

mining outline information of the detected target based on the target fused image.

20 Claims, 10 Drawing Sheets

(51) Int. Cl.
*G01S 7/41* (2006.01)
*G01S 13/87* (2006.01)

(58) Field of Classification Search
CPC ........ G01S 13/91; G01S 13/89; G01S 13/931; G01S 7/415; G01S 7/02–064; G01S 7/35–41; G01S 13/90–9092; G01S 13/34–348; G01S 7/4139; G01S 7/4147; G01S 7/28–288; G06T 5/50
USPC ......................................... 701/301, 300, 302
See application file for complete search history.

(56) References Cited

U.S. PATENT DOCUMENTS

| | | | | |
|---|---|---|---|---|
| 6,894,637 | B2 * | 5/2005 | Moreira | G01S 13/904 342/22 |
| 2012/0293359 | A1 * | 11/2012 | Fukuda | G01S 13/64 342/107 |
| 2013/0129253 | A1 * | 5/2013 | Moate | G01S 13/90 382/278 |
| 2018/0259639 | A1 * | 9/2018 | Rubel | G01S 13/26 |
| 2020/0025873 | A1 | 1/2020 | Kubertschak et al. | |
| 2023/0018183 | A1 * | 1/2023 | Zheng | G01S 13/931 |

FOREIGN PATENT DOCUMENTS

| | | | | | |
|---|---|---|---|---|---|
| CN | 104391297 | B | | 9/2017 | |
| CN | 107351785 | A | | 11/2017 | |
| CN | 109061643 | A | * | 12/2018 | G01S 13/9094 |
| CN | 109375635 | A | | 2/2019 | |
| CN | 110356325 | A | | 10/2019 | |
| CN | 110389339 | A | | 10/2019 | |
| CN | 110703245 | A | * | 1/2020 | G01S 13/9005 |
| CN | 110874945 | A | | 3/2020 | |
| WO | 2020006531 | A1 | | 1/2020 | |

* cited by examiner

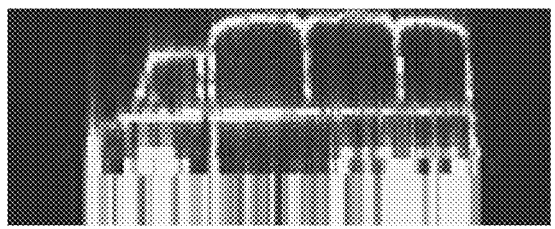

FIG. 7A

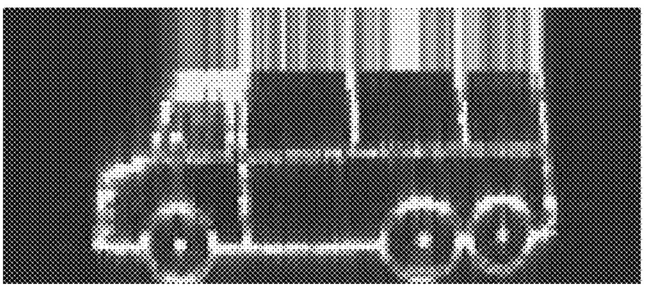

FIG. 7B

Step 301a

Determine, based on a height of a first microwave radar and a shortest distance between the first microwave radar and a detected target, a first variation relationship between a first imaging width of the detected target and a height of a sampling point, where the first variation relationship is a non-linear functional relationship

↓

Step 302a

Perform interpolation processing based on the first variation relationship, to determine a first radar imaging result image

FIG. 8

DISTRIBUTED MICROWAVE RADAR IMAGING METHOD AND APPARATUS

CROSS-REFERENCE TO RELATED APPLICATIONS

This application is a continuation application of International Patent Application No. PCT/CN2021/102923 filed on Jun. 29, 2021, which claims priority to Chinese Patent Application No. 202010617133.9 filed on Jun. 30, 2020. The disclosures of the aforementioned applications are hereby incorporated by reference in their entireties.

TECHNICAL FIELD

This application relates to the field of radar signal processing, and in particular, to a distributed microwave radar imaging method and apparatus.

BACKGROUND

A microwave radar is a radar that works in a microwave band for detection, and the microwave band usually refers to frequency domain of 100 megahertz (MHz) to 200 gigahertz (GHz). A working range of the microwave radar is 1 millimeter (mm) to 1 meter (m), and microwave radars are classified into millimeter-wave radars, centimeter-wave radars, decimeter-wave radars, and the like. A working principle thereof is to transmit a microwave detection signal to a target object, and then compare a received signal reflected from the target object with the transmitted detection signal. After signal processing, related information of the target object is obtained, for example, parameters such as a target distance, an orientation, a speed, a posture, a shape, a structure, and a size.

The millimeter-wave radar refers to a radar working in a millimeter-wave band. Usually, a millimeter wave is an electromagnetic wave in frequency domain of 30, GHz to 300 GHz (a wavelength is 1 mm to 10 mm), and a wavelength of the millimeter wave is between a centimeter wave and a light wave. Therefore, the millimeter wave has advantages of both microwave guidance and photoelectric guidance. The millimeter wave is widely used in fields such as fifth generation (5G) communications, satellite remote sensing, missile guidance, and electronic countermeasures. In recent years, with continuous improvement of components, technologies such as circuit design and antenna technologies are increasingly developed and mature. Applications of the millimeter-wave radars in road detection and autonomous driving fields have also been greatly developed.

However, in the road detection field and the autonomous driving field, the millimeter-wave radars are mainly configured to measure distances or speeds of single-point targets, and high-resolution two-dimensional imaging has not been implemented.

Currently, radar imaging processing may be implemented by using a synthetic aperture radar (SAR) technology in a side-view observation mode. Conventional radar imaging algorithms include a range Doppler algorithm (RDA), a range migration algorithm (RMA), a back projection algorithm (BPA), a frequency scaling algorithm (FSA), and the like.

However, the above algorithm cannot overcome an inherent echo aliasing problem of the SAR radar in an application process of side-view perception imaging, so that there is an imaging blind area for an observed target. The echo aliasing problem means that target sampling points whose positions are highly symmetrical relative to the radar fall into a same sampling unit because time delays of reaching the radar are the same. As a result, aliasing occurs. Therefore, imaging resolution of the observed target is low.

SUMMARY

To improve imaging resolution of a radar imaging apparatus for a detected target, this application provides a distributed microwave radar imaging method and apparatus.

According to a first aspect, an embodiment of this application provides a distributed microwave radar imaging method. The method includes obtaining a first echo signal received by a first microwave radar, where the first microwave radar is disposed at a first height, obtaining a second echo signal received by a second microwave radar, where the second microwave radar is disposed at a second height, and the first height is lower than the second height, determining a first radar imaging result image of a detected target based on the first echo signal, determining a second radar imaging result image of the detected target based on the second echo signal, and fusing the first radar imaging result image and the second radar imaging result image to obtain a target fused image.

In this implementation, because distributed microwave radar imaging implements a feature of complementarity between high and low angles of view, not only length information of the detected target can be measured, but also a problem of inconsistent resolution in a height dimension of the detected target is resolved. This implements high-resolution imaging of the detected target as a whole.

In addition, because high and low radar imaging results are fused, some images in which an echo aliasing problem occurs are cropped, thereby eliminating impact caused by the echo aliasing problem, and improving imaging resolution of the detected target.

In a possible design, determining a first radar imaging result image of a detected target based on the first echo signal includes determining a first radar imaging initial image of the detected target based on the first echo signal, and performing first geometric deformation correction on the first radar imaging initial image to obtain the first radar imaging result image, and determining a second radar imaging result image of the detected target based on the second echo signal includes determining, based on the second echo signal, a second radar imaging initial image of the detected target, and performing second geometric deformation correction on the second radar imaging initial image to obtain the second radar imaging result image.

In this implementation, geometric deformation correction is performed on the radar imaging initial image, so that impact caused by a slope shortening phenomenon in a side-view perception imaging process is eliminated. The slope shortening phenomenon causes geometric deformation of the radar imaging initial image, and imaging resolution of the detected target is improved through geometric deformation correction.

In a possible design, the first geometric deformation correction includes determining, based on a height of the first microwave radar and a shortest distance between the first microwave radar and the detected target, a first variation relationship between an imaging width and a height of the first detected target, where the first variation relationship is a non-linear functional relationship, and performing interpolation processing based on the first variation relationship, to determine the first radar imaging result image, where a first imaging width of the detected target is obtained by subtracting the shortest distance from a distance between the first microwave radar and a vertex of the detected target. The second geometric deformation correction includes determining, based on a height of the second microwave radar and a shortest distance between the second microwave radar and the detected target, a second variation relationship between the imaging width and the height of the detected target, where the second variation relationship is a non-linear functional relationship, and performing interpolation processing based on the second variation relationship, to determine the second radar imaging result image, where a second imaging width of the detected target is obtained by subtracting the shortest distance from a distance from the second microwave radar to a bottom point of the detected target.

In this implementation, a ratio of the height of the detected target to an acting distance of the microwave radar is relatively large. Compared with that in a conventional linear stretching solution in the remote sensing field, a range projection result of the detected target is more accurately described by using non-linear transformation in range projection. This improves imaging resolution of the detected target.

In a possible design, fusing the first radar imaging result image and the second radar imaging result image to obtain a target fused image includes performing splicing and fusion on an upper imaging area that is in the first radar imaging result image and that corresponds to the detected target and a lower imaging area that is in the second imaging result image and that corresponds to the detected target, to obtain the target fusion image.

In a possible design, a lower boundary of the upper imaging area and an upper boundary of the lower imaging area correspond to a reference line of the detected target.

In this implementation, high-resolution parts in the two radar imaging results are selected for fusion by splicing and fusing the high-angle and low-angle radar imaging result images, so as to overcome a problem of inconsistent resolution in a height dimension direction, and improve overall imaging resolution of the image.

In a possible design, after fusing the first radar imaging result image and the second radar imaging result image to obtain a target fused image, the method further includes determining outline information or structure information of the detected target based on the target fused image.

In a possible design, the outline information includes a two-dimensional size or a three-dimensional size of the detected target.

In this implementation, the outline information or the structure information of the detected target is determined based on the target fused image, so as to obtain accurate target feature information, improve imaging resolution, and facilitate subsequent further processing on the detected target.

According to a second aspect, an embodiment of this application provides a distributed microwave radar imaging apparatus, including a first obtaining unit configured to obtain a first echo signal received by a first microwave radar, where the first microwave radar is disposed at a first height, a second obtaining unit configured to obtain a second echo signal received by a second microwave radar, where the second microwave radar is disposed at a second height, and the first height is lower than the second height, a first imaging unit configured to determine a first radar imaging result image of a detected target based on the first echo signal, a second imaging unit configured to determine a second radar imaging result image of the detected target based on the second echo signal, and a target fusion unit configured to fuse the first radar imaging result image and the second radar imaging result image to obtain a target fusion image.

In a possible design, the first imaging unit is further configured to determine a first radar imaging initial image of the detected target based on the first echo signal, and perform first geometric deformation correction on the first radar imaging initial image to obtain the first radar imaging result image, and the second imaging unit is further configured to determine, based on the second echo signal, a second radar imaging initial image of the detected target, and perform second geometric deformation correction on the second radar imaging initial image to obtain the second radar imaging result image.

In a possible design, the first geometric deformation correction includes determining, based on a height of the first microwave radar and a shortest distance between the first microwave radar and the detected target, a first variation relationship between an imaging width and a height of the first detected target, where the first variation relationship is a non-linear functional relationship, and performing interpolation processing based on the first variation relationship, to determine the first radar imaging result image, where a first imaging width of the detected target is obtained by subtracting the shortest distance from a distance between the first microwave radar and a vertex of the detected target. The second geometric deformation correction includes determining, based on a height of the second microwave radar and a shortest distance between the second microwave radar and the detected target, a second variation relationship between the imaging width and the height of the detected target, where the second variation relationship is a non-linear functional relationship, and performing interpolation processing based on the second variation relationship, to determine the second radar imaging result image, where a second imaging width of the detected target is obtained by subtracting the shortest distance from a distance from the second microwave radar to a bottom point of the detected target.

In a possible design, the target fusion unit is further configured to perform splicing and fusion on an upper imaging area that is in a first radar imaging corrected image and that corresponds to the detected target and a lower imaging area that is in a second imaging corrected image and that corresponds to the detected target, to obtain the target fused image.

In a possible design, a lower boundary of the upper imaging area and an upper boundary of the lower imaging area correspond to a reference line of the detected target.

In a possible design, the apparatus further includes a target outline determining unit, where the target outline determining unit is further configured to determine outline information or structure information of the detected target based on the target fused image.

In a possible design, the outline information includes a two-dimensional size or a three-dimensional size of the detected target.

According to a third aspect, an embodiment of this application provides a distributed microwave radar imaging system, including a first microwave radar, a second microwave radar, and the apparatus according to any one of the designs of the second aspect.

According to a fourth aspect, an embodiment of this application provides a roadside microwave radar imaging system, including a first microwave radar, a second microwave radar, and the apparatus according to any one of the designs of the second aspect, where the first microwave radar and the second microwave radar are disposed on a roadside, and the detected target is a vehicle.

According to a fifth aspect, an embodiment of this application provides a vehicle, including a first microwave radar, a second microwave radar, and the apparatus according to any one of the designs of the second aspect, where the first microwave radar and the second microwave radar are disposed on the vehicle.

According to a sixth aspect, an embodiment of this application provides a computer-readable storage medium, where the storage medium stores a computer program, and the computer program is used to perform the imaging method according to any one of the implementations of the first aspect.

According to a seventh aspect, an embodiment of this application provides a computer program product. When the computer program product runs on a computer, the computer is enabled to perform the imaging method according to any one of the implementations of the first aspect.

According to an eighth aspect, an embodiment of this application provides an electronic device, where the electronic device includes a processor, and a memory configured to store executable instructions of the processor, where the processor is configured to perform the target object control method according to any one of the implementations of the first aspect.

According to a ninth aspect, an embodiment of this application provides a chip, including at least one processor, where the processor is coupled to a memory, and the processor is configured to read instructions in the memory and perform, based on the instructions, the method according to any one of the implementations of the first aspect.

It may be understood that any distributed microwave radar imaging apparatus, readable storage medium, computer program product, imaging system, vehicle, and electronic device provided above may be implemented by using the corresponding method provided above. Therefore, for beneficial effects that can be achieved by the distributed microwave radar imaging apparatus, readable storage medium, computer program product, imaging system, vehicle, and electronic device, refer to beneficial effects in the corresponding method provided above. Details are not described herein again.

BRIEF DESCRIPTION OF DRAWINGS

FIG. 7A is a schematic diagram of a first radar imaging result according to an embodiment of this application;

FIG. 7B is a schematic diagram of a second radar imaging result according to an embodiment of this application;

FIG. 8 is a schematic flowchart of a specific first geometric deformation correction method according to an embodiment of this application;

DESCRIPTION OF EMBODIMENTS

Figure 1:
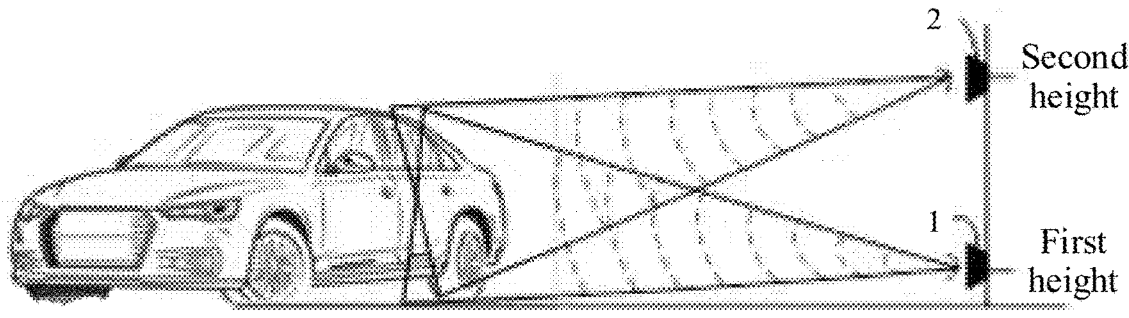
FIG. 1 is a schematic diagram of an application scenario diagram according to an embodiment of this application.

To make the objectives, technical solutions, and advantages of this application clearer, the following further describes the implementations of this application in detail with reference to the accompanying drawings.

Before the embodiments of the present disclosure are explained and described in detail, nouns used in the embodiments of the present disclosure are first described.

An SAR is a radar system working in a pulse manner. Signals of the SAR change in different degrees along a range direction and an azimuth direction. A signal changes rapidly along the range direction, and changes slowly along the azimuth direction. An imaging mechanism of SAR perceptual imaging is as follows. In the azimuth direction, linear frequency modulation (LFM) signals are continuously transmitted to an observation area to form a virtual long synthetic aperture array, that is, high resolution of imaging is formed by using a synthetic aperture principle in the azimuth direction. In the range direction, ultra-wideband LFM signals are transmitted and high range direction resolution is obtained by using a pulse compression technology, so as to obtain a two-dimensional high resolution radar perceptual image. The range direction is a direction perpendicular to the motion of the detected object, and the azimuth direction is a direction of the motion of the detected object. The SAR is an active microwave imaging system. The SAR has certain penetration and can capture more difficult target information in optical images around the clock. It has a good reconnaissance function.

A frequency of a frequency modulated continuous wave (FMCW) signal is a function of time. Two widely used frequency modulation forms are sawtooth wave frequency modulation and triangular wave frequency modulation. The FMCW signal with sawtooth wave frequency modulation is used as an example. A frequency of the transmitted signal changes linearly with time, a target echo is a replicated wave of a transmitted waveform, and a two-way echo delay $\tau=2R/C$, where R is the target distance, and C is a speed of light. In a modulation period, a part of a beat frequency is positive, and a part of the beat frequency is negative. In addition, a part of the negative beat frequency in a frequency scanning period is very small because a generally set maximum echo delay is also very small compared with the frequency scanning period.

A combination of an FMCW technology and an SAR technology in recent years promotes the birth of high resolution imaging radar with light weight, low costs and low power consumption.

An FMCW SAR usually transmits large time-bandwidth product LFM signals (and the transmitted signals occupy close to an entire pulse repetition period) to achieve high resolution in the range direction. On the one hand, it is considered that a conventional pulse SAR usually uses a direct collection mode. The FMCW SAR is different from the conventional pulse SAR. The FMCW SAR usually uses a Dechirp receiving mode. This is because the frequency scanning period of the FMCW SAR reaches a millisecond level. If the direct collection receiving mode is used, a quantity of sampling points in the range direction will reach millions or even more. Such a large amount of data poses high requirements on a data transmission rate and processing speed. This increases system complexity. On the other hand, it is considered that the FMCW SAR is usually used as a miniaturized SAR application, and a distance surveying and mapping bandwidth of the FMCW SAR is usually narrow. Therefore, the Dechirp receiving mode is appropriate. In this case, a system sampling frequency only needs to be greater than a difference frequency signal bandwidth corresponding to a scenario surveying and mapping bandwidth. Therefore, the sampling rate can be greatly reduced, the quantity of sampling points is reduced, and a system device is simplified, and is more suitable for commercial applications.

FSA is designed for Dechirp receiving data under FMCW radar, and used for directly processing a signal after Dechirp. The FSA is to perform a variable-scale operation on a range fast time in a distance-Doppler domain to correct space variability of range migration. First, the range migration of all scattering points in a scenario is corrected to the reference range, and then remaining range migration is corrected through a unified reference function. The entire algorithm only includes complex multiplication and fast Fourier transform (FFT) operation. Because of high precision and a small computation amount of the algorithm, it is widely used in Dechirp data processing. Therefore, in this application, the frequency scaling algorithm is intended to be used to perform imaging processing.

Second, an application environment involved in the embodiments of the present disclosure is described.

FIG. 1 is a schematic diagram of an application scenario according to an embodiment of this application. As shown in FIG. 1, the application scenario includes a first microwave radar 1 and a second microwave radar 2, and a detected target is a vehicle in the figure.

The first microwave radar 1 and the second microwave radar 2 may be any one or a combination of millimeter-wave radars, X-band radars, C-band radars, or the like that are classified based on frequency bands. The first microwave radar 1 and the second microwave radar 2 may be radars of a same type, or may be radars of different types.

Further, the millimeter-wave radar may be a millimeter-wave radar in a band such as 24 GHZ, 77 GHZ, 79 GHz, or 94 GHz. Alternatively, the first microwave radar 1 and the second microwave radar 2 may be any one or a combination of millimeter-wave radars of different bands, or may be millimeter-wave radars of a same band.

The distributed microwave radar imaging method in the embodiments of this application may be applied to a roadside detection system, an unmanned driving system, a driving assistance warning system, or the like. The roadside detection system can be used for roadside sensing. Roadside sensing is a basis for obtaining data of a smart transportation system and other technologies, and provides a basis for high-speed toll inspection and urban road monitoring. The required data includes a length, height, quantity of axles, speed and spacing of a vehicle target, and congestion statuses of ambient roads. The driving assistance warning system includes automatic parking, parallel line assistance, and dead zone detection.

For the roadside detection system, the detected target may be a vehicle that passes through the roadside detection system, including a car, a truck, a freight car, and the like. For an assisted driving system, the detected target may be any target such as a vehicle, a person, a tree, a road boundary, or an obstacle.

Figure 2:
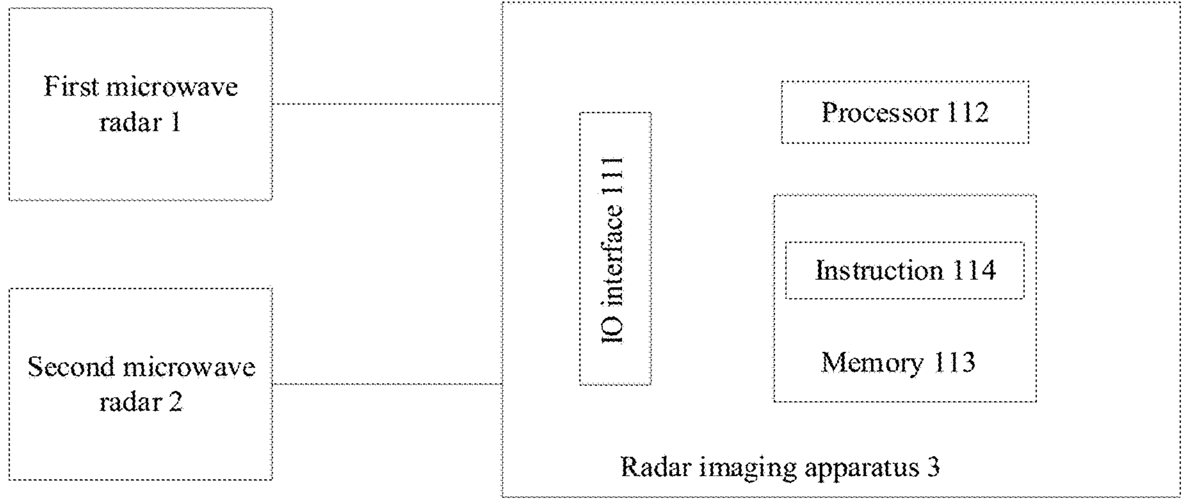
FIG. 2 is a schematic diagram of a structure of a microwave radar imaging system according to an embodiment of this application.

FIG. 2 is a schematic diagram of a structure of a microwave radar imaging system according to an embodiment of this application. The microwave radar imaging system includes a first microwave radar 1, a second microwave radar 2, and a distributed microwave radar imaging apparatus 3. The distributed microwave radar imaging apparatus 3 is separately connected to the first microwave radar 1 and the second microwave radar 2.

The distributed microwave radar imaging apparatus 3 processes the radar echo data by using the distributed microwave radar imaging method in this embodiment of this application, to image the detected target, to determine target information. The target information reflects information such as outline dimension information, a speed, and a location of the detected target. The distributed microwave radar imaging method in this embodiment of this application can improve imaging resolution of a detected target. For an implementation of the distributed microwave radar imaging method, refer to explanations and descriptions in the following embodiments.

The distributed microwave radar imaging apparatus 3 may include an IO interface 111, a processor 112, and a memory 113 configured to store executable instructions of the processor.

The IO interface 111 may include an input/output (I/O) interface. For example, the output device may be a liquid-crystal display (LCD), a light-emitting diode (LED) display device, a cathode-ray tube (CRT) display device, or a projector. The input device may be a mouse, a keyboard, a touchscreen device, a sensor device, at least two imaging sensors, or the like.

The processor 112 may be any conventional processor, such as a commercially available central processing unit (CPU). Optionally, the processor may be a dedicated device, for example, an application-specific integrated circuit (ASIC) or another hardware-based processor. Although FIG. 2 functionally shows the processor and the memory, a person of ordinary skill in the art should understand that the processor, the radar imaging apparatus, or the memory may actually include a plurality of processors, radar imaging apparatuses, or memories that may or may not be stored in a same physical housing. For example, the memory may be a hard disk drive or another storage medium located in a housing different from that of the distributed microwave radar imaging apparatus 3. Therefore, a reference to the processor or the radar imaging apparatus is understood to include a reference to a set of processors or computers or memories that may or may not operate in parallel. Different from using a single processor to perform the steps described herein, some components, such as a steering component and a deceleration component, each may include a respective processor that performs only computation related to a component-specific function.

In various aspects described herein, the processor may be located far away from the microwave radar and wirelessly communicate with the microwave radar. In another aspect, some processes described herein are performed on a processor disposed inside a roadside base station or the vehicle, while others are performed by a remote processor, including performing steps necessary for single manipulation.

In some embodiments, the memory 113 may include instructions 114 (for example, program logic), and the instructions 114 may be executed by the processor 112 to perform various functions of the distributed microwave radar imaging apparatus 3, including the functions described above. The memory 113 may also include additional instructions, including one or more of instructions for sending data to, receiving data from, interacting with, and/or controlling the first microwave radar 1 or the second microwave radar 2.

In addition to the instructions 114, the memory 113 may further store data, for example, an image of a detected target. Alternatively, in an in-vehicle mode, the memory 113 may store a road map, route information, a location, a direction, and a speed of a vehicle, other such vehicle data, and other information. Such information may be used by the vehicle and the computer system when the vehicle operates in an autonomous mode, a semi-autonomous mode, and/or a manual mode.

It should be noted that the foregoing distributed microwave radar imaging apparatus 3, the first microwave radar 1, and the second microwave radar 2 may be disposed on a same device, for example, a roadside sensing base station or a vehicle. In another implementation, the first microwave radar 1 and the second microwave radar 2 may be disposed on different devices, for example, on different sensing base stations on a road side. The distributed microwave radar imaging apparatus 3 may be a terminal device. The imaging apparatus may communicate with the devices on which the first microwave radar 1 and the second microwave radar 2 are disposed, to obtain radar echo data. For example, the roadside sensing base station returns echo data of the first microwave radar 1 and the second microwave radar 2, or detection information such as a processed radar image or a target feature to a toll collection and detection system based on an air interface channel status, to implement functions of inspection and toll collection in a high-speed scenario and urban road monitoring.

The terminal device may be a fixed terminal or a mobile terminal. The fixed terminal may be an industrial computer or the like. The mobile terminal may also be referred to as user equipment, an access terminal, a subscriber unit, a subscriber station, a mobile station, a mobile console, a user terminal, a terminal, a wireless communications device, a user agent, or a user apparatus. The mobile terminal may be a vehicle-mounted device, a wearable device, a smartphone, a tablet computer, a personal digital processing device, a handheld device with a wireless communication function, another processing device connected to a wireless modem, or the like.

Figure 3:
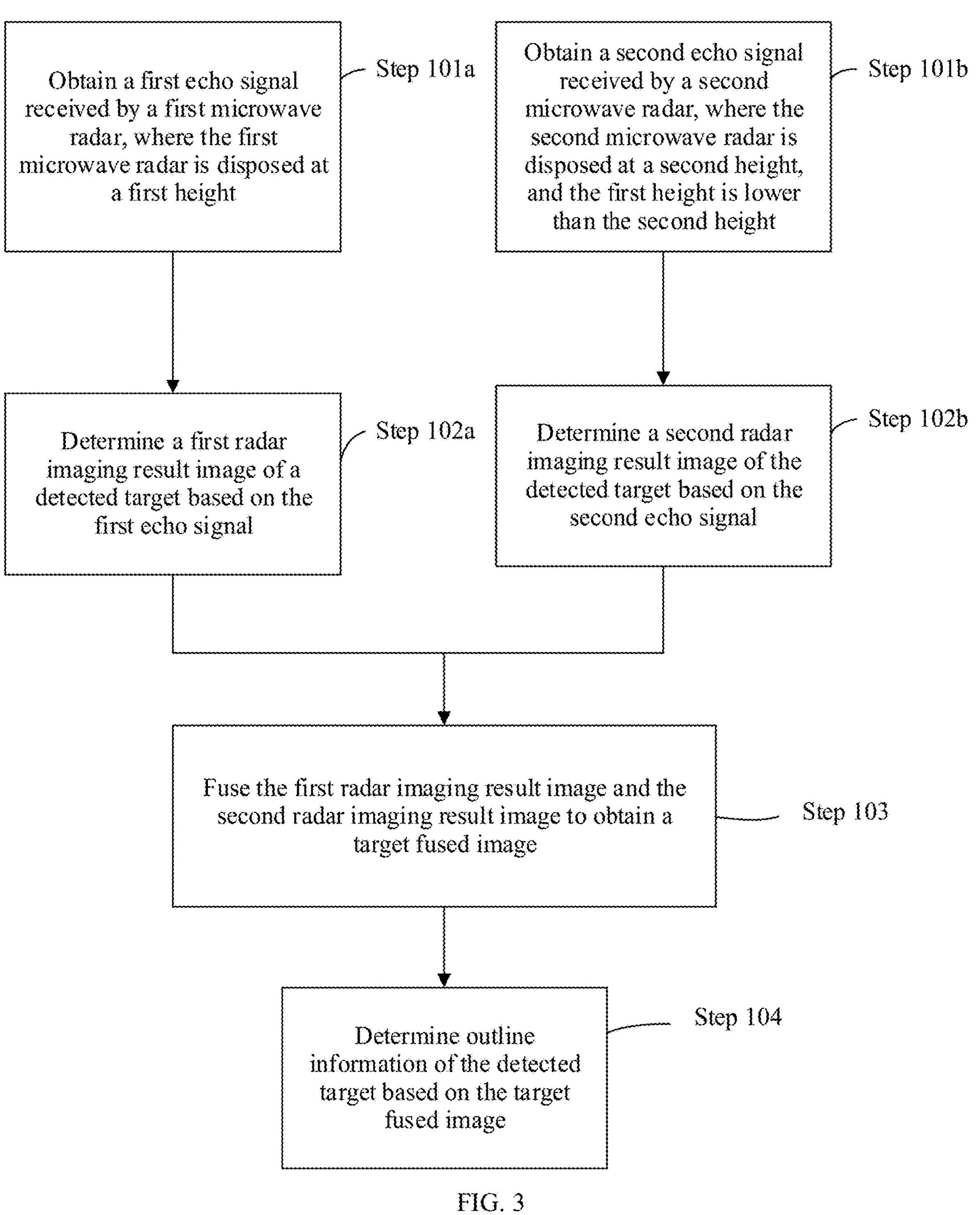
FIG. 3 is a schematic flowchart of a distributed microwave radar imaging method according to an embodiment of this application.

Alternatively, the terminal device may be replaced with a control unit of a roadside base station or a vehicle control unit. The radar imaging apparatus in this embodiment may be implemented in a software and/or hardware manner. For example, the apparatus may be the foregoing terminal device or an internal chip of the terminal device. The following describes a radar imaging method by using a distributed microwave radar imaging apparatus as an execution body. As shown in FIG. 3, the method may include the following steps.

When the detected target enters a radar beam detection range, the distributed microwave radar imaging apparatus 3 controls the first microwave radar 1 and the second microwave radar 2 to start radar observation on the detected target until the detected target leaves the radar beam.

The first microwave radar 1 includes a first transmitter. The first transmitter may be an antenna. The distributed microwave radar imaging apparatus 3 controls the antenna to transmit a first detection electromagnetic wave to the detected target. The first detection electromagnetic wave is reflected after passing through the detected target. The antenna of the first microwave radar 1 receives a returned electromagnetic wave, namely, a first echo signal.

The second microwave radar 2 includes a second transmitter. The second transmitter may be an antenna. The distributed microwave radar imaging apparatus 3 controls the antenna to transmit a second detection electromagnetic wave to the detected target. The second detection electromagnetic wave is reflected after passing through the detected target. The antenna of the second microwave radar 2 receives a returned electromagnetic wave, namely, a second echo signal.

A plurality of types of electromagnetic wave signals may be selected for the first detection electromagnetic wave and the second detection electromagnetic wave. However, the first detection electromagnetic wave transmitted by the first microwave radar 1 may be a LFM continuous wave (FMCW) signal. If a carrier frequency signal is $\exp(j2\pi f_c t)$, a pulse signal is transmitted in sequence in a repetition period T. A time starting from a transmission time $t_m = mT$ (m=0, 1, 2 . . . ) is referred to as a slow time, and a time starting from a transmission time $\hat{t}$ is referred to as a fast time. The fast time is used to measure a propagation time of radio waves, and the slow time is used to measure a time at which pulses are transmitted. A relationship between the two times and a full time is as follows: $\hat{t} = t - mT$. Therefore, a mathematical expression 1 for the first electromagnetic wave detection $S_0(\hat{t}, tm)$ is:

$$S_0(\hat{t}, t_m) = rect\left[\frac{\hat{t}}{T_p}\right]\exp\left[j2\pi\left(f_c t + \frac{1}{2}\gamma\hat{t}^2\right)\right] \tag{1}$$

$$rect\left[\frac{\hat{t}}{T_p}\right] = \begin{cases} 1, & |\hat{t}| \le \frac{T_p}{2} \\ 0, & |\hat{t}| > \frac{T_p}{2} \end{cases},$$

$f_c$ is a center frequency, $T_p$ is a pulse width, $\gamma$ is a modulation frequency, t is the full time, $\hat{t}$ is the fast time, and tm is the slow time.

The first detection electromagnetic wave $S_0(\hat{t}, tm)$ transmitted by the first microwave radar 1 passes through the detected target, and is reflected to form the first echo signal. A receive antenna of the first microwave radar 1 transmits the received first echo signal to a radar receiver, where a distance from a sampling point on the detected target to the first microwave radar 1 is $R(\hat{t},tm)$, and a mathematical expression 2 of the first echo signal $S_r(\hat{t},tm)$ received by the first microwave radar 1 is:

$$S_r(\hat{t}, t_m) = A \cdot rect\left[\frac{\hat{t} - 2 \cdot R(\hat{t}, t_m)/C}{T_p}\right] \exp\left[j2\pi\left(f_c\left(t - \frac{2R(\hat{t}, t_m)}{C}\right) + \frac{1}{2}\gamma\left(\hat{t} - \frac{2R(\hat{t}, t_m)}{C}\right)^2\right)\right] \quad (2)$$

A is a constant, C is a speed of light, and other parameters have the same meanings as those in the expression 1. The second detection electromagnetic wave transmitted by the second microwave radar 2 may be the same as the first detection electromagnetic wave transmitted by the first microwave radar. A specific mathematical expression is the same as the expression 1, and a mathematical expression of the second echo signal is the same as the expression 2.

Step 101*a*: Obtain the first echo signal received by the first microwave radar, where the first microwave radar is disposed at a first height.

Step 101*b*: Obtain the second echo signal received by the second microwave radar, where the second microwave radar is disposed at a second height, and the first height is lower than the second height.

The first echo signal is a reflected signal obtained by detecting the detected target by using the first detection electromagnetic wave transmitted by the first microwave radar 1. The first microwave radar 1 sends the obtained first echo signal to the distributed microwave radar imaging apparatus 3 in this embodiment.

As shown in FIG. 1, the first height is a disposing height of the first microwave radar 1. Further, the first microwave radar 1 may be disposed at a relatively low position, to obtain data of a low angle of view, so that aliasing does not occur on an upper imaging part of the detected target. For example, the first microwave radar 1 disposed on the roadside sensing base station may be disposed at a height equivalent to a bottom position of the vehicle, and the first microwave radar 1 disposed on the vehicle may be disposed at a lower part or a bottom of a vehicle body.

The second echo signal is a reflected signal obtained by detecting the detected target by using the second detection electromagnetic wave transmitted by the second microwave radar 2. The second microwave radar 2 sends an obtained second microwave signal to the distributed microwave radar imaging apparatus 3 in this embodiment.

As shown in FIG. 1, the second height is a disposing height of the second microwave radar 2. Further, the second microwave radar 2 may be disposed at a relatively high position, to obtain data of a high angle of view, so that aliasing does not occur on a lower imaging part of the detected target. For example, the second microwave radar 2 disposed on the roadside sensing base station may be disposed at a height equivalent to a top position of the vehicle, and the second microwave radar 2 disposed on the vehicle may be disposed on an upper part or a top of the vehicle body.

The first height is lower than the second height, that is, the first microwave radar 1 is disposed at a lower part of the second microwave radar 2. The first height being lower than the second height only intends to limit the first microwave radar 1 and the second microwave radar 2 in a height dimension direction, and coordinate positions of horizontal planes on which the first microwave radar 1 and the second microwave radar 2 are located are not limited. Coordinates of the first microwave radar 1 and the second microwave radar 2 on the horizontal planes may be the same or different.

101*a* and 101*b* may be performed in any sequence.

Step 102*a*: Determine a first radar imaging result image of the detected target based on the first echo signal.

Step 102*b*: Determine a second radar imaging result image of the detected target based on the second echo signal.

After receiving the first echo signal and the second echo signal, the distributed microwave radar imaging apparatus 3 separately performs radar imaging processing on echo data of the microwave radars at different angles, to obtain imaging result images of the microwave radars, namely, the first radar imaging result image and the second radar imaging result image.

102*a* and 102*b* may be performed in any sequence.

Step 103: Fuse the first radar imaging result image and the second radar imaging result image to obtain a target fused image.

The first radar imaging result image and the second radar imaging result image that have different high and low angles of view are placed at a same coordinate, optimal extraction and complementary fusion are performed on the two images, and the two images are finally fused to obtain one fused image, namely, the target fused image. The target fused image may include target information with finer resolution and more accurate and complete target features.

Further, center registration may be performed on the first radar imaging result image and the second radar imaging result image. An optimal threshold is selected for a two-dimensional image, the threshold is used as a reference line for resolution segmentation and capture, and a target is selected to perform optimal capture and fusion in an imaging area with relatively high resolution, so that a lower boundary of an upper imaging area of the detected target and an upper boundary of a lower imaging area of the detected target correspond to the reference line of the detected target, and the reference line may be selected as a center line.

The optimal threshold may be set in advance, and a specific preset value may be set by a person skilled in the art based on experience, or may be determined by using a specific effect of radar imaging. A specific value selected for the optimal threshold and a detailed setting method are not limited in this application.

Step 104: Determine outline information or structure information of the detected target based on the target fused image.

After obtaining the target fused image, the distributed microwave radar imaging apparatus 3 determines the outline information or structure information of the detected target, where outline dimension information of the detected target includes two-dimensional size information including length and height information, and three-dimensional size information including length, height, and width information. Further, the structure information of the detected target may be obtained. For example, when the detected target is a vehicle, information about a wheel and an axle of the vehicle may be obtained.

In this embodiment of this application, because distributed microwave radar imaging implements a feature of complementarity between high and low angles of view, not only the length information of the detected target can be measured, but also a problem of inconsistent resolution in a height dimension of the detected target is resolved. This implements high-resolution imaging of the detected target as a whole. Moreover, because the high and low radar imaging results are fused, some images with an echo aliasing problem are cropped, thereby eliminating an imaging blind area caused by using a single radar.

Figure 4:
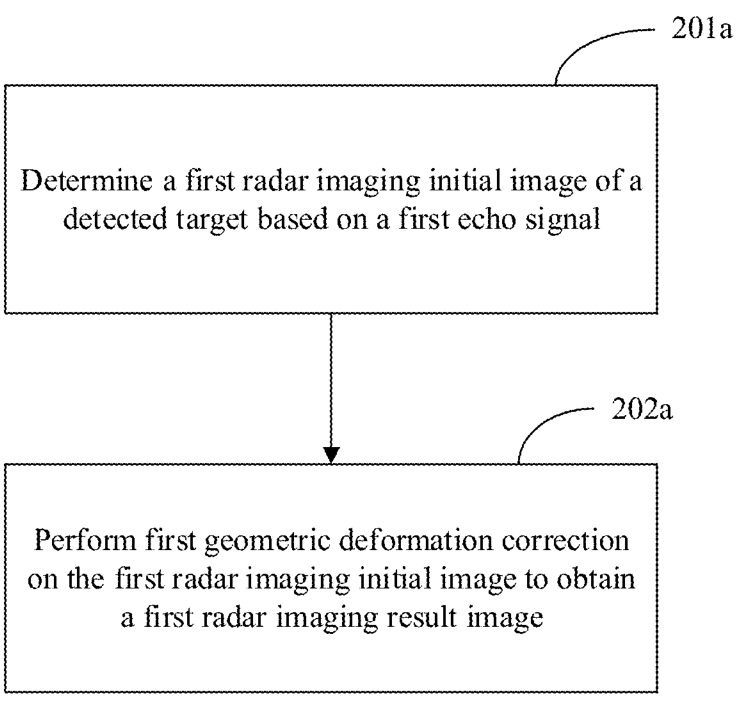
FIG. 4 is a schematic flowchart of a method for determining a first radar imaging result based on a first echo signal according to an embodiment of this application.

Further, FIG. 4 is a schematic diagram of a method for determining a first radar imaging result based on a first echo signal according to an embodiment of this application. The method includes the following steps.

Step 201*a*: Determine a first radar imaging initial image of the detected target based on the first echo signal.

A plurality of algorithms may be used to determine the first radar imaging initial image. A frequency variable scale (FSA) algorithm is used. In this embodiment of this application, radar imaging processing is separately performed on radar data of different angles based on FSA radar imaging processing, to obtain a radar imaging initial image corresponding to each microwave radar.

After receiving the first echo signal, the distributed microwave radar imaging apparatus 3 needs to perform Dechirp processing in signal processing. This reduces an AD sampling rate.

The Dechirp is to use a specific time as a fixed time and use an LFM signal with a same frequency and a same modulation frequency as a reference signal, to perform difference frequency processing by using the reference signal and the first echo signal. If a reference distance is $R_{ref}$, a mathematical expression 3 of the reference signal is:

$$S_{ref}(\hat{t}, t_m) = rect\left[\frac{\hat{t} - 2 \cdot R_{ref}/C}{T_p}\right]\exp\left[j2\pi\left(f_c\left(t - \frac{2R_{ref}}{C}\right) + \frac{1}{2}\gamma\left(\hat{t} - \frac{2R_{ref}}{C}\right)^2\right)\right] \quad (3)$$

$R_{ref}$ is the reference distance, and physical meanings represented by other letters in the expression 3 are the same as meanings of the expressions 1 and 2. Details are not described herein again.

A mathematical expression 4 for a Dechirp pulse pressure is:

$$S(\hat{t},tm)=S_r(\hat{t},tm)\cdot S_{ref}(\hat{t},tm) \quad (4)$$

$S_r(\hat{t},tm)$ is the first echo signal, and $S_{ref}(\hat{t},tm)$ is a conjugate of the reference signal.

A difference frequency output after the Dechirp processing is obtained through the expressions 2 to 4, and an expression 5 of the echo after target difference frequency processing is obtained as follows:

$$S(\hat{t}, t_m) = A \cdot rect\left[\frac{\hat{t} - 2 \cdot \frac{R(\hat{t}, t_m)}{C}}{T_p}\right]\exp\left[j\frac{4\pi\gamma}{C^2}(R(\hat{t}, t_m) - R_{ref})^2\right] \cdot \exp\left[-j\frac{4\pi}{\lambda}R(\hat{t}, t_m)\right] \cdot \exp\left[-j\frac{4\pi}{\lambda}(R(\hat{t}, t_m) - R_{ref})\left(\hat{t} - \frac{2R_{ref}}{C}\right)\right] \quad (5)$$

A is an amplitude constant, $\gamma$ is a modulation frequency, $T_p$ is a pulse width, $R_{ref}$ is a reference distance, $R(\hat{t},tm)$ is an instantaneous distance between the detected target and a microwave radar, C is a speed of light, $\lambda$ is a wavelength of the microwave radar, $\hat{t}$ is a range fast time, a value range of the range fast time is $-T_{p/2} \le \hat{t} \le T_{p/2}$, $T_p$ is a pulse width, $t_m$ is a slow time, a value range of the slow time is $-T_{a/2} \le t \le T_{a/2}$, and $T_a$ is a time when the target passes through a radar beam.

The FSA algorithm is a scale variation for the range fast time in the range-Doppler domain to correct the space variation of the range migration. After the FSA algorithm processing, the range migration correction can be completed. Radar imaging processing, including range processing and azimuth processing, completes a range operation and subsequent azimuth processing. In an azimuth direction, conventional azimuth pulse compression processing is performed.

Finally, a first radar initial imaging result of the detected target is obtained as an expression 6:

$$S(f_r, t_m; R_B) = sinc\left(\pi\frac{T_p}{\beta}\left(f_r + \frac{2\gamma}{C}(R_B - R_{ref})\right)\right)sinc(\pi\Delta f_a t_m) \quad (6)$$

In Expression 6, $1/\beta$ is a scale factor of a range migration, $\Delta f_a$ is a Doppler bandwidth in the azimuth direction, and $R_B$ is a scene center. Meanings of other parameters are the same as those of parameters in the foregoing formula. Details are not described herein again.

Figure 5A:
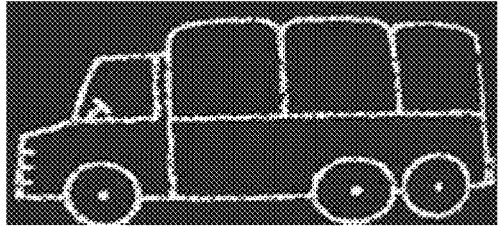
FIG. 5A is a schematic diagram of an actual size of a vehicle according to an embodiment of this application.
Figure 5B:
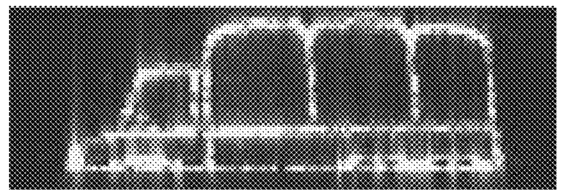
FIG. 5B is a schematic diagram of a first radar initial imaging result according to an embodiment of this application.
Figure 5C:
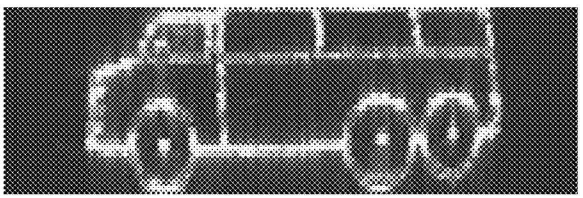
FIG. 5C is a schematic diagram of a second radar initial imaging result according to an embodiment of this application.

The first radar initial imaging result is shown in FIG. 5, in FIG. 5 the detected target is a vehicle. Further, FIG. 5A is a schematic diagram of an actual size of the vehicle. FIG. 5B is a schematic diagram of the first radar initial imaging result. FIG. 5C is a schematic diagram of the second radar initial imaging result.

Compared with that in FIG. 5A to FIG. 5C, it is found that the initial imaging result of the vehicle is subjected to non-linear compression. In an example, a magnification ratio in an upper part in FIG. 5B is too large, and a compression ratio in a lower part is too small. In addition, an underside of a wheel is aliased. A magnification ratio in a lower part in FIG. 5C is too large. A compression ratio in an upper part is too small. Therefore, it can be known that the first radar initial imaging result has both geometric deformation compression and aliasing characteristics, the first microwave radar imaging initial image needs to be corrected.

Step 202*a*: Perform first geometric deformation correction on the first microwave radar imaging initial image to obtain a first radar imaging result image.

As described above, in this embodiment, an SAR technology is used, and one of features of an SAR image is that a slope distance is shortened. The slope distance is shortened because a position of a side-view radar imaging image along a range direction is determined by a slope distance between each resolution unit of the target and the radar. According to this specification, the slope distance is shortened when a three-dimensional area is projected into a two-dimensional image.

Figure 6:
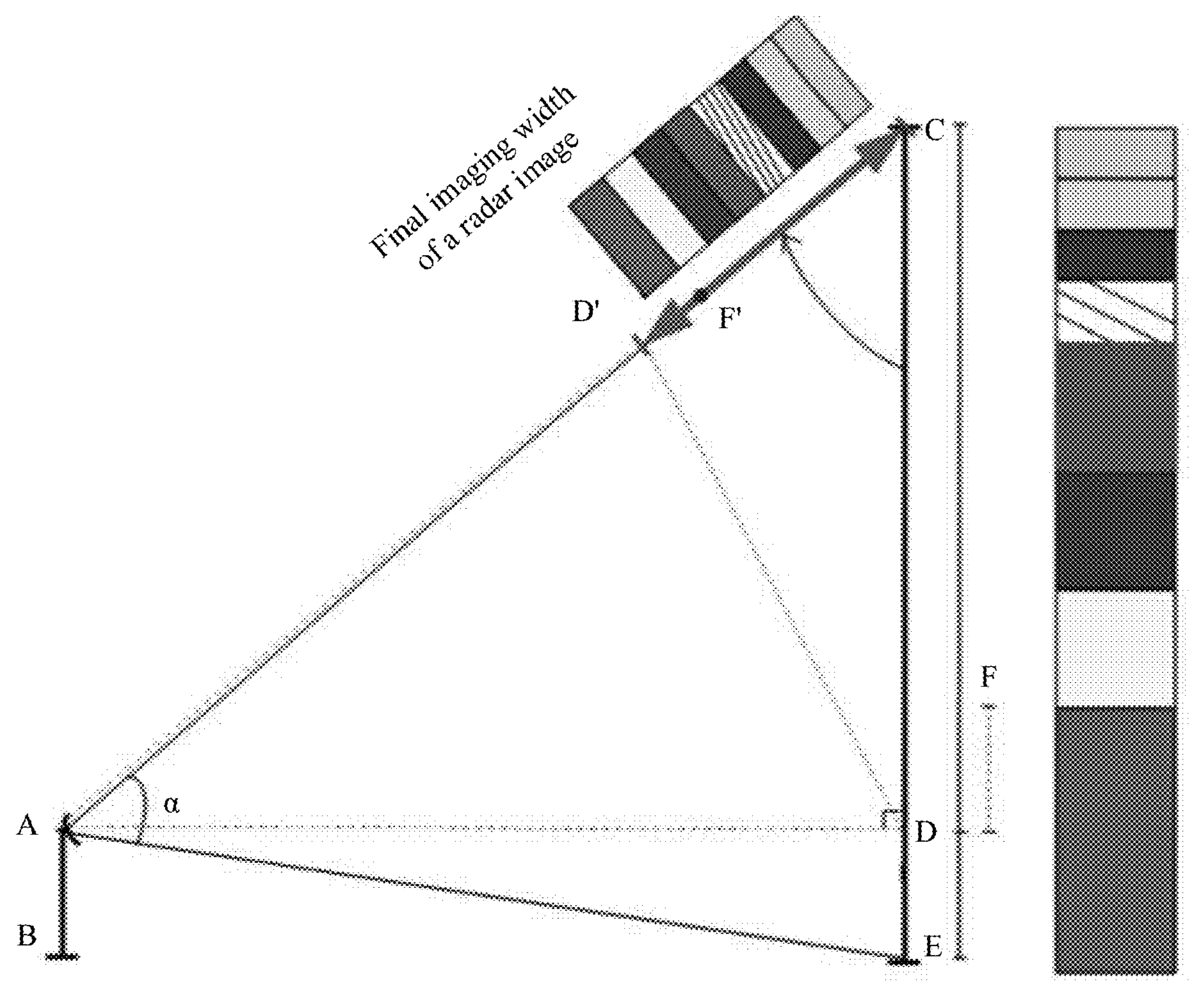
FIG. 6 is a schematic diagram of a width of a detected target imaged by a first microwave radar according to an embodiment of this application.

As shown in FIG. 6, a height of a first microwave radar is AB. When the radar irradiates the detected target, for example, a vehicle, an effective coverage beam angle in the range direction is a, and a height of the to-be-observed detected target is CE. A point D and a point A are at a same horizontal height, and a point F and a point E are symmetrical about the point D, that is, AB=DE=DF.

The first microwave radar antenna radiates a wide-band electromagnetic wave to a to-be-observed detected target. The electromagnetic wave is radiated to a side surface of the detected target, and is reflected back to a receiver of the first microwave radar. A radar echo reflected by a closer detected target component is first received by the receiver. In an example, an echo at the point D of the detected target is first received by the receiver, echoes at the point E and the point F are then received by the receiver, and an echo at the point C is finally received by the receiver. The echoes at the points F and E are the same, and enter the receiver at the same time.

The echoes at the point F and the point E cannot be distinguished from each other in a time dimension. SAR imaging distance dimension information is distinguished based on a time when an echo arrives at the radar receiver.

Based on the imaging characteristic of the SAR radar, an imaging result of the detected target is projected in a beam direction, and a final imaging width is projected on AC. A final imaging width of the detected target with a height of CE is CD'. Imaging information of DE and DF is aliased at a D'F area of the imaging width. In this embodiment, a horizontal spacing between the detected target and the first microwave radar is detected based on a geometric relationship between parameters in FIG. 6, the horizontal spacing is used as a reference line for range projection, and geometric inversion parameter calculation is performed on an imaging result obtained by the first microwave radar with reference to height information of the first microwave radar, to obtain an actual height of each sampling point on the detected target, so as to perform correction.

The imaging width of the detected target is defined as width information of the height information of the detected target in the first radar imaging result image in imaging of the detected target by the first microwave radar.

Step 201*b*: Determine, based on the second echo signal, a second radar imaging initial image of the detected target.

Step 202*b*: Perform second geometric deformation correction on the second radar imaging initial image to obtain a second radar imaging result image.

Processing methods in steps 201*b* and 202*b* are the same as those in steps 201*a* and 202*a*. Details are not described herein again.

The first radar imaging result image and the second radar imaging result image are shown in FIG. 7A and FIG. 7B.

In this implementation, geometric deformation correction is performed on the radar imaging initial image, so that impact caused by an inherent slope shortening phenomenon in a side-view perception imaging process is eliminated. The slope shortening phenomenon causes geometric deformation of the radar imaging initial image, and imaging resolution of the detected target is improved through geometric deformation correction.

Further, the first geometric deformation correction and the second geometric deformation correction include range projection, that is, a size length of the detected target in a line-of-sight direction of the radar is projected to an actual height of the target. A specific first geometric deformation correction method is basically the same as a specific second geometric deformation correction method.

FIG. 8 is a schematic diagram of a first geometric deformation correction method according to an embodiment of this application. The following uses the first geometric deformation correction as an example. Based on the foregoing embodiment, as shown in FIG. 8, the method may include the following steps.

Step 301*a*: Determine, based on a height of a first microwave radar and a shortest distance between the first microwave radar and the detected target, a first variation relationship between a first imaging width of the detected target and a height, where the first variation relationship is a non-linear functional relationship.

Geometric parameters required in this embodiment may include: the height of the first microwave radar and the shortest distance between the first microwave radar and the detected target.

The height of the first microwave radar may be recorded when the first microwave radar is deployed. As shown in FIG. 6, the first microwave radar is deployed at a position of the point A, and the point B is the ground. It can be learned that the height of the first microwave radar is AB.

For the shortest distance between the first microwave radar and the detected target, the distributed microwave radar imaging apparatus 3 may detect, by using Hough transform, a nearest range gate of the detected target as the shortest distance between the first microwave radar and the detected target. As shown in FIG. 6, the position of the detected target is CE, and the shortest distance between the first microwave radar and the detected target is AD.

The geometric inversion parameter calculation in this embodiment refers to obtaining a relationship between a radar imaging width and a height of the detected target by using the radar imaging initial image, so that range projection can be performed.

As shown in FIG. 6, the foregoing shortest distance AD is used as a range projection reference line AD', and geometric inversion parameter calculation is performed on the imaging result obtained by the first microwave radar.

In side azimuth imaging of the first microwave radar, a geometric inversion parameter calculation relationship is obtained based on an SAR imaging geometric relationship in FIG. 6:

$$(W_s + L_{AD})^2 = (H_{CE} - H_{AB})^2 + L_{AD}^2 \tag{7}$$

$W_S$ is an imaging width of the detected target in the radar image, and the imaging width $L_{D'C}$ is obtained by subtracting the shortest distance $L_{AD}$ from a distance $L_{AC}$ from the first microwave radar to a vertex of the detected target.

The height of the detected target is CE, and is compressed into an imaging width length D'C in the radar imaging result. It should be noted that the DE segment and the FD segment of the original detected target are aliased in an imaging process, and are aliased in a D'F' segment of a final imaging width.

According to the formula 7, a first variation relation between an imaging width $W_S$ of the detected target and a height $H_{CE}$ of the detected target is obtained as a formula 8:

$$F(x) = \sqrt{(x - x_0)^2 + y_0^2} - y_0 \tag{8}$$

x represents a height of a detected target sampling point, F(x) represents an imaging width $W_S$ corresponding to the detected target sampling point, $x_0$ represents a height $H_{AB}$ of the first microwave radar, and $y_0$ represents a shortest distance $L_{AD}$ between the detected target and the first microwave radar.

Step 301*b*: Perform interpolation processing based on the first variation relationship, to determine a first radar imaging result image.

Figure 9:
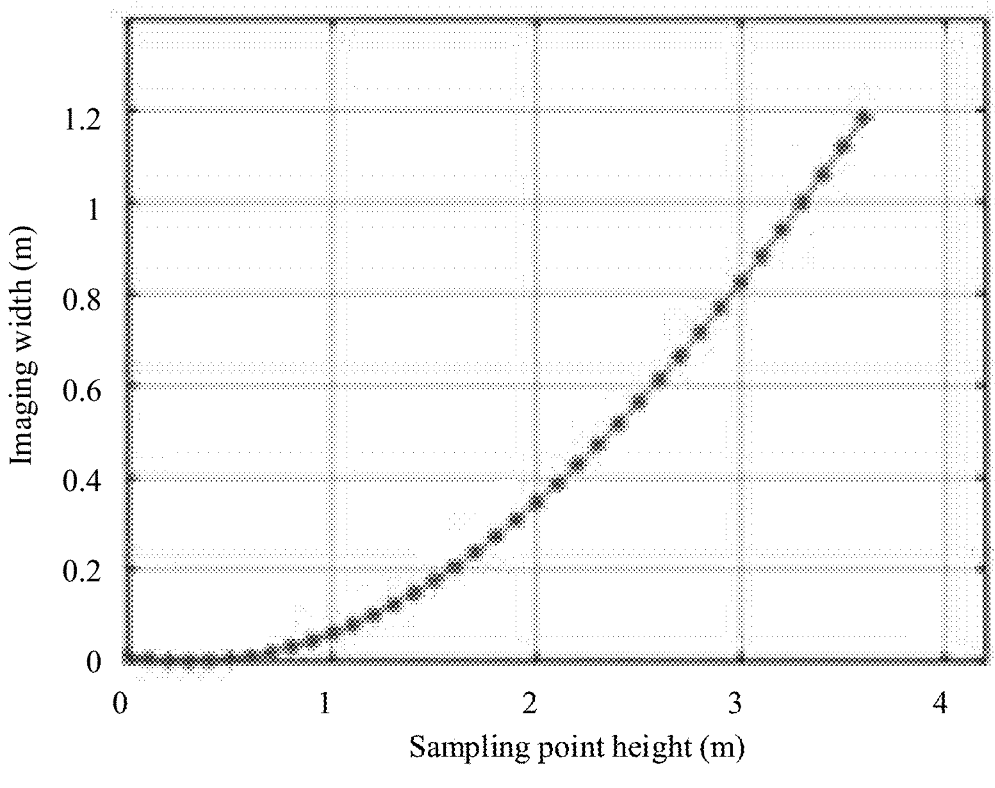
FIG. 9 is a schematic diagram of a change curve of an imaging width and a height of a detected target according to an embodiment of this application.

FIG. 9 shows a first variation curve chart that is of an imaging width and a height of a detected target and that is drawn based on the first variation relationship. Projection interpolation processing is performed on the first microwave radar initial imaging result according to the variation curve chart of the imaging width and height of the detected target, to obtain a result obtained after the geometric deformation correction.

Figure 10:
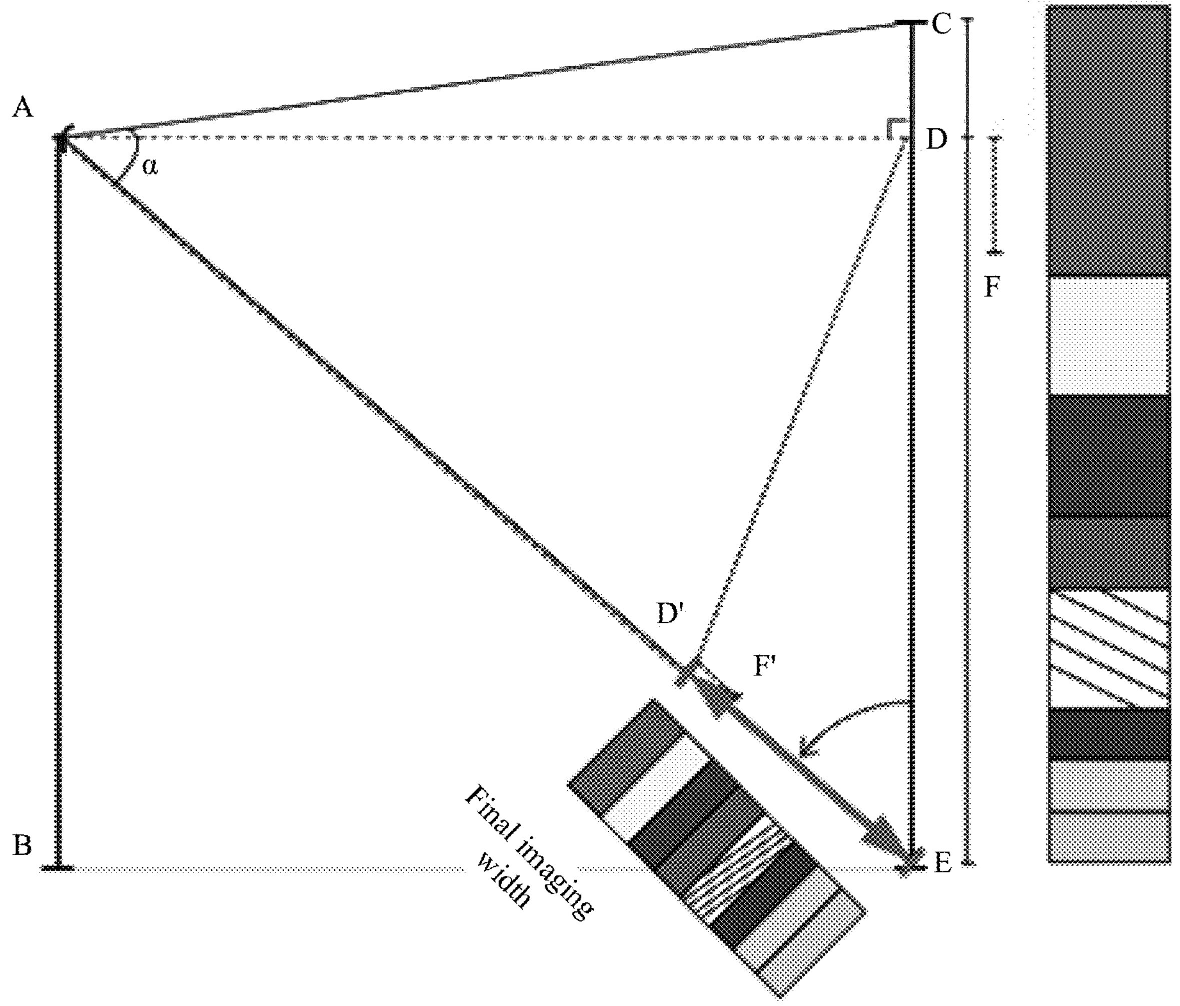
FIG. 10 is a schematic diagram of a width of a detected target imaged by a second microwave radar according to an embodiment of this application.

A second geometric deformation correction method is the same as the first geometric deformation correction method. Details are not described again. However, because the second microwave radar is disposed at a relatively high location, as shown in FIG. 10, a position relationship between the second microwave radar and the detected target determines that the second imaging width of the detected target is obtained by subtracting the shortest distance from the distance from the second microwave radar to the bottom point of the detected target.

Similar to a derivation process of the formula 8, a second variation relation between the imaging width of the detected target and the height of the detected target is obtained as a formula 9:

$$F(x)=\sqrt{(x-x_0)^2+y_0^2}-y_0 \tag{9}$$

x represents a height of a detected target sampling point, F(x) represents an imaging width $W_S$ corresponding to the detected target sampling point, $x_0$ represents a height $H_{AB}$ of the second microwave radar, and $y_0$ represents a shortest distance $L_{AD}$ between the detected target and the second microwave radar.

In this implementation, range projection is used, that is, the size length of the detected target in the line-of-sight direction of the radar is projected onto an actual height of the target. Because the target is non-linearly compressed in the line-of-sight direction of the radar, correction processing needs to be performed to obtain the actual height of the target. The conventional range projection adopts a linear stretching scheme. Because the radar is loaded on a satellite or an aircraft and an acting distance is long, a ratio of the width of the observed target to the acting distance between the radars is small. The non-linear transformation in the range projection can be ignored, and the approximate linear stretching processing can be used. However, in this solution, a ratio of a height of an observed target to an acting distance between radars is not small, and non-linear transformation in range projection cannot be ignored. Therefore, compared with the conventional stretching solution, this implementation is more accurate, and can more accurately describe a range projection result of the target. This improves imaging resolution.

Figure 11:
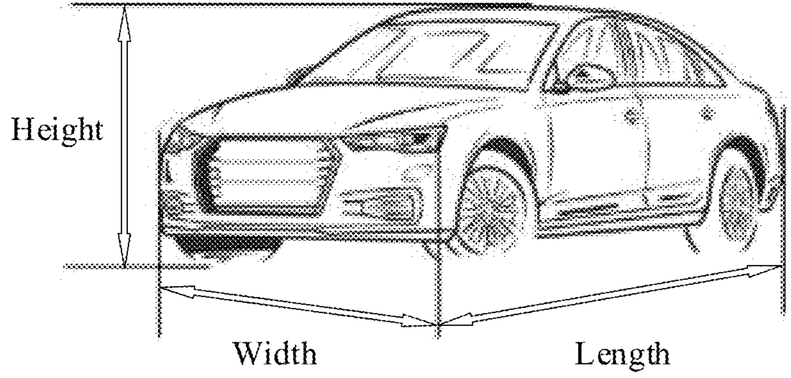
FIG. 11 is a schematic diagram of an outline dimension and a direction of a detected target according to an embodiment of this application.

Further, after obtaining the target fused image, the distributed microwave radar imaging apparatus 3 may further determine outline information and structure information of the detected target. As shown in FIG. 11, the outline dimension information of the detected target includes two-dimensional length and height information, or three-dimensional length, height, and width information. Structure information of the detected target may be any conventional structure of the detected target, including a specific quantity, a size, and the like of wheels, axles, and the like. On the basis of the foregoing embodiment, the method may include the following.

For two-dimensional size information, interval equalization processing is performed on two dimensions of two spliced and fused images, that is, a sampling unit Deltr_R in a height dimension of a side-view target is used as a reference, and interpolation is performed on a sampling unit Deltr_A in a length dimension (azimuth direction), or a sampling unit Deltr_A in a length dimension (azimuth direction) is compressed into a unified sampling spacing. An interpolation or compression multiple Deltr_times is calculated as follows:

$$\text{Deltr\_times}=\frac{\text{Deltr\_A}}{\text{Deltr\_R}}$$

The height dimension sampling unit and the sampling unit in the length dimension (azimuth direction) are respectively as follows:

$$\text{Deltr\_R}=\frac{C}{2B}$$

$$\text{Deltr\_A}=\frac{V}{PRF}$$

C is a speed of light, B is a radar emission bandwidth, and PRF is a radar sampling frequency.

The foregoing operation is to obtain a result that the two-dimensional sampling units of the target height and the length are equal. Length and height information of the observation target are obtained by multiplying the quantity of scattering points by a width of the sampling unit.

Figure 12:
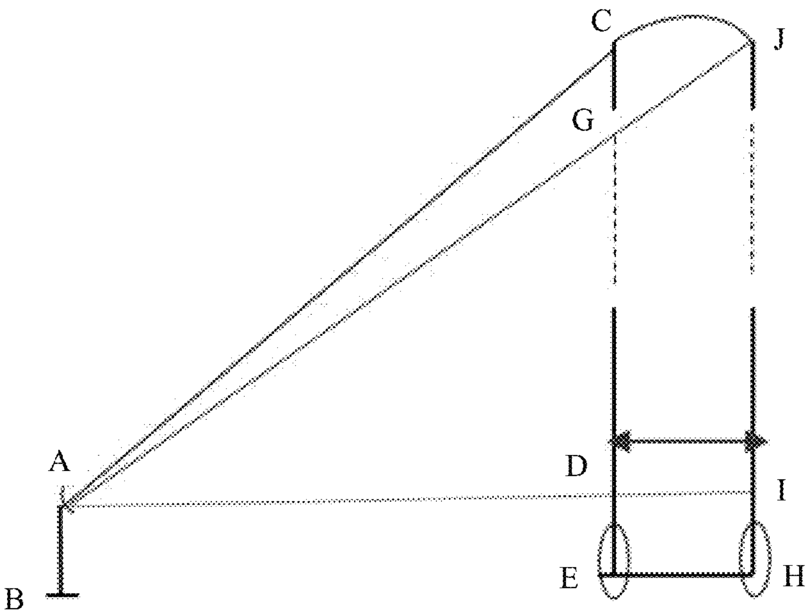
FIG. 12 is a schematic geometric diagram of a three-dimensional size of a detected target according to an embodiment of this application.

FIG. 12 is a schematic geometric diagram of three-dimensional size information of a detected target. As shown in FIG. 12, AB is a schematic diagram of a first microwave radar, the detected target is a vehicle, a right-side diagram HCJE is a schematic diagram of the vehicle, and a dashed line part is a location of a window of the vehicle. The first microwave radar first irradiates the detected target, for example, a scattering area on a left side of the vehicle, and transmits the detected target to the other side of the vehicle through a vehicle window. An L-shaped angle inverse characteristic is formed on a top of the other side of the vehicle. This causes a strong scattering characteristic. As shown in the foregoing embodiment, height inversion of a CE segment on the left side of the vehicle has been completed, and subsequently, width information of the vehicle target is further inverted. An example inversion is as follows. The first microwave radar detects information about a point J on the top of the other side of the vehicle. Lengths of AJ, JI, and AD are known. Now, a DI length needs to be solved based on a right triangle AIJ:

$$(AI)^2+(JI)^2=(AJ)^2$$

$$AI=AD+Bus_{width}$$

$$JI=Bus_{hight}-AB$$

$$(AD+Bus_{width})^2+(Bus_{hight}-AB)^2=(AJ)^2$$

A width DI of the vehicle target can be learned by using the foregoing substitution solution.

A three-dimensional stereoscopic imaging result of the target vehicle may be constructed based on the obtained height of the point J and the DI information of the width relative to the left facade of the vehicle.

In addition, according to the radar imaging method in this embodiment of this application, a detected target in an ambient environment can be imaged, and a size, a structure, a speed, and position information of the detected target can be accurately provided, so as to perform a corresponding operation subsequently. For example, the roadside imaging apparatus may charge a passing vehicle based on the size and the structure of the detected target, and the in-vehicle imaging apparatus performs an assisted driving operation on the vehicle.

It may be understood that the methods or steps in the foregoing embodiments may be implemented by a radar imaging apparatus or a chip inside a radar imaging apparatus.

Figure 13:
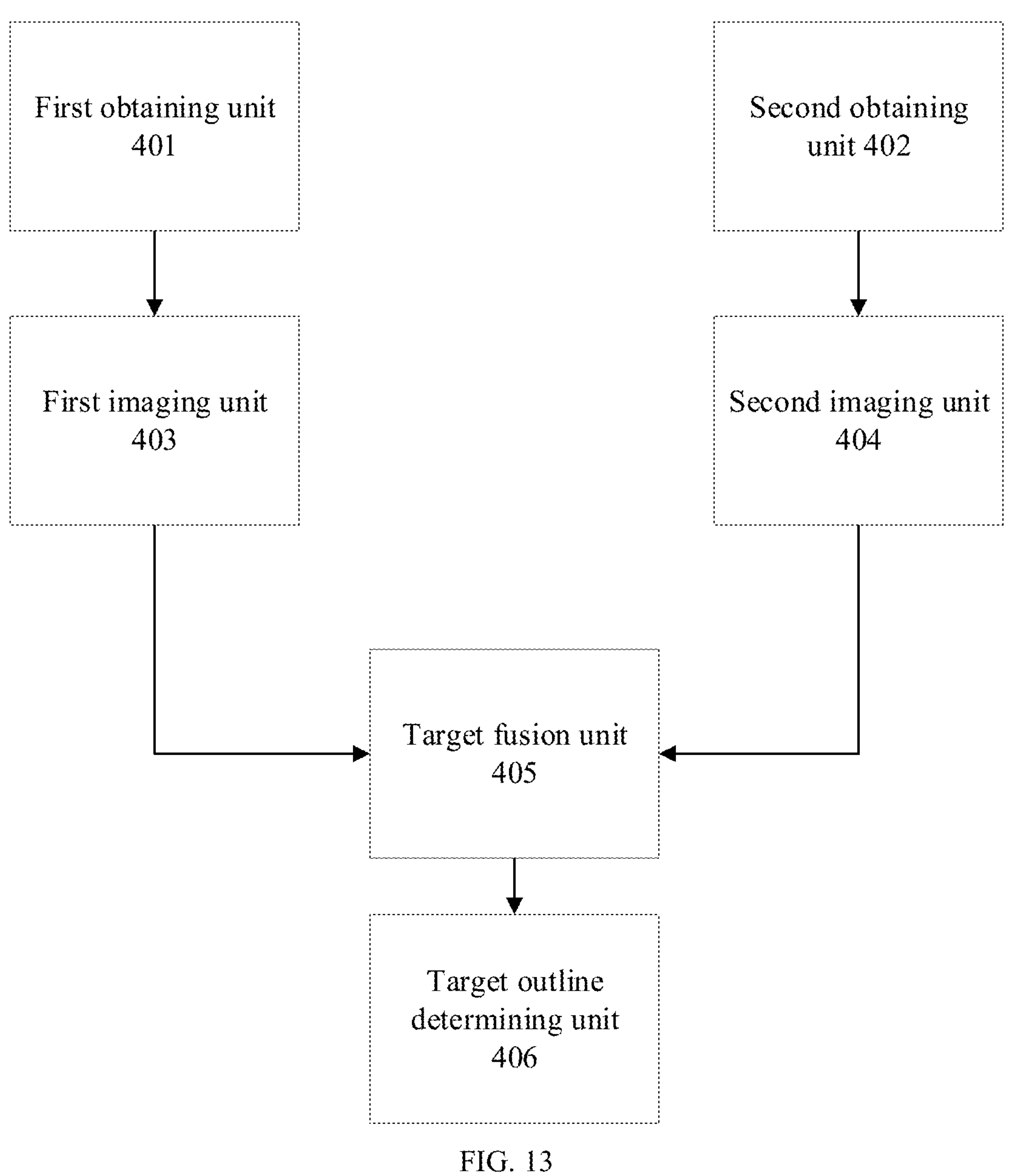
FIG. 13 is a schematic diagram of a structure of a distributed microwave radar imaging apparatus according to an embodiment of this application.

FIG. 13 is a schematic diagram of a structure of a distributed microwave radar imaging apparatus according to an embodiment of this application. As shown in FIG. 13, the distributed microwave radar imaging apparatus in this application may include a first obtaining unit 401 configured to obtain a first echo signal received by a first microwave radar, where the first microwave radar is disposed at a first height, a second obtaining unit 402 configured to obtain a second echo signal received by a second microwave radar, where the second microwave radar is disposed at a second height, and the first height is lower than the second height, a first imaging unit 403 configured to determine a first radar imaging result image of a detected target based on the first echo signal, a second imaging unit 404 configured to determine a second radar imaging result image of the detected target based on the second echo signal, and a target fusion unit 405 configured to fuse the first radar imaging result image and the second radar imaging result image, to obtain a target fused image.

In some embodiments, the first imaging unit 403 is further configured to determine a first radar imaging initial image of the detected target based on the first echo signal, and perform first geometric deformation correction on the first radar imaging initial image to obtain the first radar imaging result image, and the second imaging unit 404 is further configured to determine, based on the second echo signal, a second radar imaging initial image of the detected target, and perform second geometric deformation correction on the second radar imaging initial image to obtain the second radar imaging result image.

In some embodiments, the first geometric deformation correction includes determining, based on a height of the first microwave radar and a shortest distance between the first microwave radar and the detected target, a first variation relationship between an imaging width and a height of the first detected target, where the first variation relationship is a non-linear functional relationship, and performing interpolation processing based on the first variation relationship, to determine the first radar imaging result image, where a first imaging width of the detected target is obtained by subtracting the shortest distance from a distance between the first microwave radar and a vertex of the detected target. The second geometric deformation correction includes determining, based on a height of the second microwave radar and a shortest distance between the second microwave radar and the detected target, a second variation relationship between the imaging width and the height of the detected target, where the second variation relationship is a non-linear functional relationship, and performing interpolation processing based on the second variation relationship, to determine the second radar imaging result image, where a second imaging width of the detected target is obtained by subtracting the shortest distance from a distance from the second microwave radar to a bottom point of the detected target.

In some embodiments, the target fusion unit 405 is further configured to perform splicing and fusion on an upper imaging area that is in a first radar imaging corrected image and that corresponds to the detected target and a lower imaging area that is in a second imaging corrected image and that corresponds to the detected target, to obtain the target fused image. A lower boundary of the upper imaging area and an upper boundary of the lower imaging area correspond to the reference line of the detected target.

In some embodiments, the distributed microwave radar imaging apparatus further includes a target outline determining unit 406, and is further configured to determine outline information of the detected target based on the target fused image. The outline information includes a two-dimensional size or a three-dimensional size of the detected target.

The distributed microwave radar imaging apparatus described above in this embodiment may be configured to execute the technical solutions in the foregoing method embodiments. Implementation principles and technical effects thereof are similar. For functions of the modules, refer to corresponding descriptions in the method embodiments. Details are not described herein again.

An embodiment of this application further provides a distributed microwave radar imaging system, including a first microwave radar 1, a second microwave radar 2, and a distributed microwave radar imaging apparatus 3.

The distributed microwave radar imaging system in this embodiment may be configured to execute the technical solutions in the foregoing method embodiments. Implementation principles and technical effects thereof are similar. For functions of each component, refer to corresponding descriptions in the method embodiments. Details are not described herein again.

This embodiment further provides a roadside microwave radar imaging system, including a first microwave radar 1, a second microwave radar 2, and a distributed microwave radar imaging apparatus 3, where the first microwave radar 1 and the second microwave radar 2 are disposed on a roadside, and the detected target is a vehicle.

The roadside microwave radar imaging system in this embodiment may be configured to execute the technical solutions in the foregoing method embodiments. Implementation principles and technical effects thereof are similar. For functions of each component, refer to corresponding descriptions in the method embodiments. Details are not described herein again.

This embodiment further provides a vehicle. The vehicle includes a first microwave radar 1, a second microwave radar 2, and a distributed microwave radar imaging apparatus 3, where the first microwave radar 1 and the second microwave radar 2 are disposed on the vehicle.

The vehicle in this embodiment may be configured to execute the technical solutions in the foregoing method embodiments. Implementation principles and technical effects thereof are similar. For functions of components, refer to corresponding descriptions in the method embodiments. Details are not described herein again.

It should be noted that, in embodiments of this application, module division is an example, and is merely a logical function division. In actual implementation, another division manner may be used. Functional modules in embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store a program, such as a Universal Serial Bus (USB) flash drive, a removable hard disk, a read-only memory (ROM), a random-access memory (RAM), a magnetic disk, or an optical disc.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state disk (SSD)), or the like.

The program instructions may be implemented in a form of a software function unit and can be sold or used as an independent product. The memory may be a computer-readable storage medium in any form. Based on such an understanding, all or some of the technical solutions of this application may be embodied in a form of a software product, and the software product includes several instructions for instructing a computer device, which may be further the processor, to perform all or some of the steps of the target detection apparatus in the embodiments of this application. The foregoing computer-readable storage medium includes any medium that can store a program, such as a USB flash drive, a removable hard disk, a ROM, a RAM, a magnetic disk, or an optical disc.

The electronic device in this embodiment may be configured to execute the technical solutions in the foregoing method embodiments. Implementation principles and technical effects thereof are similar. For functions of components, refer to corresponding descriptions in the embodiments. Details are not described herein again.

In conclusion, the foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A distributed microwave radar imaging method, comprising:

obtaining a first echo signal of a first microwave radar, wherein the first microwave radar is disposed at a first height;

obtaining a second echo signal of a second microwave radar, wherein the second microwave radar is disposed at a second height, and wherein the first height is lower than the second height;

obtaining a first radar imaging result image of a detected target based on the first echo signal, wherein the first radar imaging result image comprises a first angle of view and includes a non-aliased upper imaging portion of the detected target;

obtaining a second radar imaging result image of the detected target based the second echo signal, wherein the second radar imaging result image comprises a second angle of view and includes a non-aliased lower imaging portion of the detected target;

positioning the first radar imaging result image and the second radar imaging result image at a same center when the first angle of view is different than the second angle of view;

performing center registration of the first radar imaging result image and the second radar imaging result image to align a lower boundary of the non-aliased upper imaging portion and an upper boundary of the non-aliased lower imaging portion with a reference line of the detected target, wherein the reference line is a center line; and fusing the first radar imaging result image and the second radar imaging result image to obtain a target fused image by splicing the non-aliased upper imaging portion with the non-aliased lower imaging portion.

2. The distributed microwave radar imaging method of claim 1, wherein determining the first radar imaging result image comprises:

determining a first radar imaging initial image of the detected target based on the first echo signal; and performing first geometric deformation correction on the first radar imaging initial image to obtain the first radar imaging result image;

wherein determining the second radar imaging result image comprises:

determining a second radar imaging initial image of the detected target based on the second echo signal; and performing second geometric deformation correction on the second radar imaging initial image to obtain the second radar imaging result image.

3. The distributed microwave radar imaging method of claim 2, wherein the first geometric deformation correction comprises:

obtaining a first imaging width of the detected target by subtracting a first shortest distance between the first microwave radar and the detected target from a first distance between the first microwave radar and a vertex of the detected target;

determining, based on the first height and the first shortest distance, a first variation relationship between the first imaging width and a third height of the detected target, wherein the first variation relationship is a first nonlinear functional relationship; and performing first interpolation processing based on the first variation relationship to determine the first radar imaging result image, and wherein the second geometric deformation correction comprises:

obtaining a second imaging width of the detected target by subtracting a second shortest distance between the second microwave radar and the detected target from a second distance from the second microwave radar to a bottom point of the detected target;

determining, based on the second height and the second shortest distance, a second variation relationship between the second imaging width and the third height, wherein the second variation relationship is a second non-linear functional relationship; and performing second interpolation processing based on the second variation relationship to determine the second radar imaging result image.

4. The distributed microwave radar imaging method of claim 1, wherein fusing the first radar imaging result image and the second radar imaging result image to obtain the target fused image comprises performing splicing and fusion on an upper imaging area and a lower imaging area to obtain the target fused image, wherein the upper imaging area is in the first radar imaging result image and corresponds to the detected target, and wherein the lower imaging area is in the second radar imaging result image and corresponds to the detected target.

5. The distributed microwave radar imaging method of claim 4, wherein a lower boundary of the upper imaging area and an upper boundary of the lower imaging area correspond to a reference line of the detected target.

6. The distributed microwave radar imaging method of claim 1, wherein after fusing the first radar imaging result image and the second radar imaging result image to obtain the target fused image, the distributed microwave radar imaging method further comprises determining, based on the target fused image, outline information of the detected target or structure information of the detected target.

7. The distributed microwave radar imaging method of claim 6, wherein the outline information comprises a two-dimensional size of the detected target or a three-dimensional size of the detected target.

8. An apparatus comprising:

a computer-readable storage medium configured to store instructions; and a processor coupled to the computer-readable storage medium and configured to execute the instructions to cause the apparatus to:

obtain a first echo signal of a first microwave radar, wherein the first microwave radar is disposed at a first height;

obtain a second echo signal of a second microwave radar, wherein the second microwave radar is disposed at a second height, and wherein the first height is lower than the second height;

obtain a first radar imaging result image of a detected target based on the first echo signal, wherein the first radar imaging result image comprises a first angle of view and includes a non-aliased upper imaging portion of the detected target;

obtain a second radar imaging result image of the detected target based the second echo signal, wherein the second radar imaging result image comprises a second angle of view and includes a non-aliased lower imaging portion of the detected target;

position the first radar imaging result image and the second radar imaging result image at a same center when the first angle of view is different than the second angle of view;

perform center registration of the first radar imaging result image and the second radar imaging result image to align a lower boundary of the non-aliased upper imaging portion and an upper boundary of the non-aliased lower imaging portion with a reference line of the detected target, wherein the reference line is a center line; and fuse the first radar imaging result image and the second radar imaging result image to obtain a target fused image by splicing the non-aliased upper imaging portion with the non-aliased lower imaging portion.

9. The apparatus of claim 8, wherein the instructions to determine the first radar imaging result image further comprises instructions that cause the apparatus to:

determine a first radar imaging initial image of the detected target based on the first echo signal; and perform first geometric deformation correction on the first radar imaging initial image to obtain the first radar imaging result image, wherein the instructions to determine the second radar imaging result image further comprises instructions that cause the apparatus to:

determine a second radar imaging initial image of the detected target based on the second echo signal; and perform second geometric deformation correction on the second radar imaging initial image to obtain the second radar imaging result image.

10. The apparatus of claim 9, wherein when performing the first geometric deformation correction, the processor is further configured to execute the instructions to cause the apparatus to:

obtain a first imaging width of the detected target by subtracting a first shortest distance between the first microwave radar and the detected target from a first distance between the first microwave radar and a vertex of the detected target;

determine, based on the first height and the first shortest distance, a first variation relationship between the first imaging width and a third height of the detected target, wherein the first variation relationship is a first non-linear functional relationship; and perform first interpolation processing based on the first variation relationship to determine the first radar imaging result image, and wherein when performing the second geometric deformation correction, the processor is further configured to execute the instructions to cause the apparatus to:

obtain a second imaging width of the detected target by subtracting a second shortest distance between the second microwave radar and the detected target from a second distance from the second microwave radar to a bottom point of the detected target;

determine, based on the second height and the second shortest distance, a second variation relationship between the second imaging width and the third height, wherein the second variation relationship is a second non-linear functional relationship; and perform second interpolation processing based on the second variation relationship to determine the second radar imaging result image.

11. The apparatus of claim 8, wherein the instructions to fuse the first radar imaging result image and the second radar imaging result image further comprise instructions that cause the apparatus to perform splicing and fusion on an upper imaging area and a lower imaging area to obtain the target fused image, wherein the upper imaging area is in the first radar imaging result image and that corresponds to the detected target, and wherein the lower imaging area is in the second radar imaging result image and that corresponds to the detected target.

12. The apparatus of claim 11, wherein a lower boundary of the upper imaging area and an upper boundary of the lower imaging area correspond to a reference line of the detected target.

13. The apparatus of claim 8, wherein after fusing the first radar imaging result image and the second radar imaging result image to obtain the target fused image, the processor is further configured to execute the instructions to cause the apparatus to determine, based on the target fused image, outline information of the detected target or structure information of the detected target.

14. The apparatus of claim 13, wherein the outline information comprises a two-dimensional size of the detected target or a three-dimensional size of the detected target.

15. A distributed microwave radar imaging system comprising:

a first microwave radar disposed at a first height and configured to receive a first echo signal;

a second microwave radar disposed at a second height and configured to receive a second echo signal, wherein the first height is lower than the second height; and an apparatus configured to:

obtain the first echo signal from the first microwave radar;

obtain the second echo signal from the second microwave radar;

obtain a first radar imaging result image of a detected target based on the first echo signal, wherein the first radar imaging result image comprises a first angle of view and includes a non-aliased upper imaging portion of the detected target;

obtain a second radar imaging result image of the detected target based on the second echo signal, wherein the second radar imaging result image comprises a second angle of view and includes a non-aliased lower imaging portion of the detected target;

position the first radar imaging result image and the second radar imaging result image at a same center when the first angle of view is different than the second angle of view;

perform center registration of the first radar imaging result image and the second radar imaging result image to align a lower boundary of the non-aliased upper imaging portion and an upper boundary of the non-aliased lower imaging portion with a reference line of the detected target, wherein the reference line is a center line; and fuse the first radar imaging result image and the second radar imaging result image to obtain a target fused image by splicing the non-aliased upper imaging portion with the non-aliased lower imaging portion.

16. The distributed microwave radar imaging system of claim 15, wherein the apparatus is further configured to:

determine a first radar imaging initial image of the detected target based on the first echo signal;

perform first geometric deformation correction on the first radar imaging initial image to obtain the first radar imaging result image;

determine a second radar imaging initial image of the detected target based on the second echo signal; and perform second geometric deformation correction on the second radar imaging initial image to obtain the second radar imaging result image.

17. The distributed microwave radar imaging system of claim 16, wherein when performing the first geometric deformation correction, the apparatus is further configured to:

obtain a first imaging width of the detected target by subtracting a first shortest distance between the first microwave radar and the detected target from a first distance between the first microwave radar and a vertex of the detected target;

determine, based on the first height and the first shortest distance, a first variation relationship between the first imaging width and a third height of the detected target, wherein the first variation relationship is a first non-linear functional relationship; and perform first interpolation processing based on the first variation relationship to determine the first radar imaging result image, wherein when performing the second geometric deformation correction, the apparatus is further configured to:

obtain a second imaging width of the detected target by subtracting a second shortest distance between the second microwave radar and the detected target from a second distance from the second microwave radar to a bottom point of the detected target;

determine, based on the second height and the second shortest distance, a second variation relationship between the second imaging width and the third height, wherein the second variation relationship is a second non-linear functional relationship; and perform second interpolation processing based on the second variation relationship to determine the second radar imaging result image.

18. The distributed microwave radar imaging system of claim 15, wherein the apparatus is further configured to perform splicing and fusion on an upper imaging area and a lower imaging area to obtain the target fused image, wherein the upper imaging area is in the first radar imaging result image and that corresponds to the detected target, and wherein the lower imaging area is in the second radar imaging result image and that corresponds to the detected target.

19. The distributed microwave radar imaging system of claim 18, wherein a lower boundary of the upper imaging area and an upper boundary of the lower imaging area correspond to a reference line of the detected target.

20. The distributed microwave radar imaging system of claim 15, wherein the apparatus is further configured to determine, based on the target fused image, outline information of the detected target or structure information of the detected target, wherein the outline information comprises a two-dimensional size of the detected target or a three-dimensional size of the detected target.

* * * * *